Patented May 26, 1936

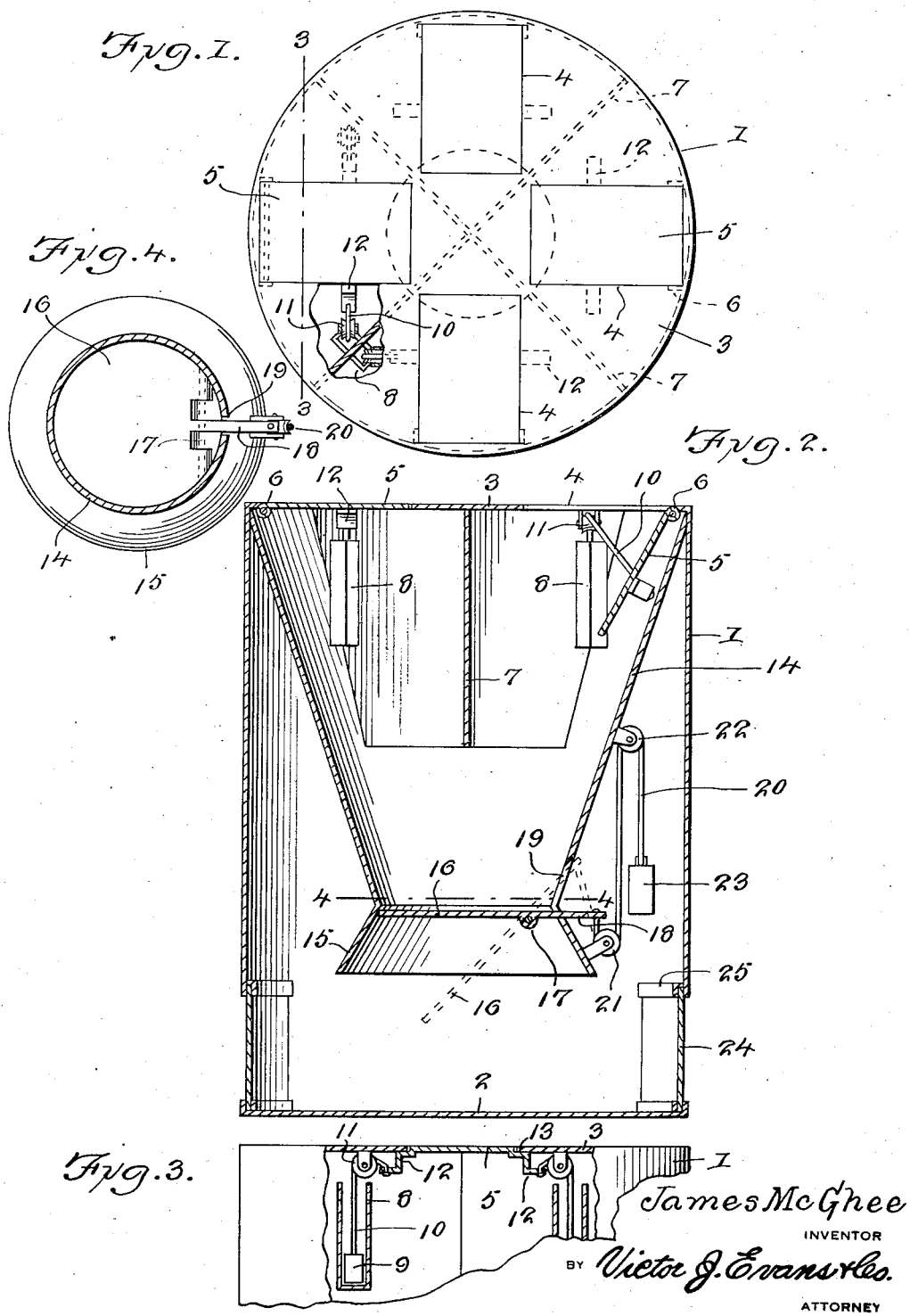

2,042,349

UNITED STATES PATENT OFFICE 2,042,349

ANIMAL TRAP

James McGhee, Cocoa, Fla.

Application October 23, 1935, Serial No. 46,421

2 Claims. (Cl. 43—69)

This invention relates to animal traps and its general object is to provide a trap that is self setting, in that it includes animal actuated doors providing entrance means, that are automatically closed and retained accordingly after the passage of an animal through the openings thereof, with the result that a number of animals can be caught and retained within the trap before the latter requires any attention.

A further object of the invention is to provide a trap of the self setting or ever set type that retains the animal alive, can be easily emptied, requires no bait, is simple in construction, inexpensive to manufacture, and extremely efficient in use, operation and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a top plan view of the trap which forms the subject matter of the present invention with a part broken away and parts in section.

Figure 2 is a vertical sectional view taken through the trap.

Figure 3 is a sectional view taken approximately on line 3—3 of Figure 1, looking in the direction of the arrows.

Figure 4 is a sectional view taken approximately on line 4—4 of Figure 2, looking in the direction of the arrows.

Referring to the drawing in detail, the reference numeral 1 indicates the body of my trap which in the form as shown is of cylindrical formation, but I want it understood that the body can be of other shapes without departing from the spirit of the invention. The body is provided with a closed bottom 2 which may be removable therefrom and the top 3 is preferably formed integral with the body as clearly shown in Figure 2. The top has arranged therein a plurality of entrance openings 4 which are preferably of rectangular configuration and arranged in pairs, with the openings of each pair disposed in alignment with respect to each other.

Each of the openings is provided with a closure or trap door 5 which is hinged as at 6 at its outer end, to the top 3, as shown in Figure 2, and these doors are normally held closed and flush with the top 3 by weight means which will be presently described.

Secured to the top and depending therefrom are partitions 7 which extend between the openings to provide individual passageways therefor. The partitions preferably have their outer ends inclined inwardly and terminate at their lower ends a considerable distance above the horizontal center of the body.

The weight means for each door includes guides in the form of boxes 8, for the weights 9 and the weights have secured thereto one of the ends of cables 10, that are trained about pulleys 11 mounted on the top 3, while the opposite ends of the cables 10 are fixed to angle brackets 12 secured to the opposite sides of the doors 5, as best shown in Figure 3. The angle brackets are provided with shoulders 13 to act as stops to engage the undersurface of the top 3 to hold the doors in closed position flush with the top. The boxes 8 are fixed to the partitions 7.

Depending from the juncture of the top 3 with the side wall of the body is a truncated conical member 14 which tapers toward the lower end of the body but terminates a considerable distance above the bottom, and has formed with its lower end an outwardly flared annular flange 15. The lower end of the member 14 is closed by a trap door 16 that is hinged to the flange 15 as at 17 and extends across the flange adjacent to the juncture thereof, with the lower end of the member 14, as clearly shown in Figure 2. The door 16 is provided with an arm 18 that is moved in a slot 19 and secured to the arm 18 is one end of a cable 20 which is trained about a pulley 21 carried by the flange 15, as well as a pulley 22 on the member 14, while the opposite end of the cable 20 is secured to a weight 23, with the result that the door 16 is normally held in closed position.

Disposed in the body 1 and preferably arranged upon diametrically opposite sides thereof adjacent the bottom are door openings which are closed by sliding doors 24 mounted in guides 25. These openings are adapted to empty the trap, as will be apparent.

From the above description and disclosure of the drawing, it will be obvious that my trap is self setting, and can be made in any size to catch practically all types of animals as well as fowl, such as wild turkeys and the like. In the use of my trap it may be embedded in the ground with the top 3 flush therewith, with the result that an animal or fowl coming in contact with any one of the trap doors 5 will result in the door being opened by the weight of the animal overbalancing the weights 9, therefore the door will open and allow the animal to drop upon the door 16 which will likewise open and deposit the animal within the body.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An animal trap comprising a hollow body in the form of a container including a top and a bottom, said top having openings arranged therein, partition means depending from the top and providing a passageway leading from each opening, weight actuated doors for closing the openings, brackets secured to said doors and having the weights of the doors connected therewith, guide means for the weights and secured to the partition means, said brackets including shoulders to hold the doors flush with the top, means surrounding the partition means and having an open lower end, and a weight actuated door for closing the open lower end.

2. An animal trap comprising a hollow body in the form of a container having a closed bottom and a top, the latter having openings arranged therein, weight actuated doors for closing the openings, partition means depending from the top and providing passageways leading from the openings, guide means for the weights of the doors and secured to the partition means, brackets secured to the doors and having the weights connected therewith, said brackets including shoulders engageable with the top for holding the doors flush therewith, conical means depending from the top and surrounding the partition means, said conical means having an open lower end, an outwardly flared flange extending from the open lower end, a weight actuated door for closing the open lower end and said body having door closed openings therein.

JAMES McGHEE.